United States Patent
Uchida et al.

(10) Patent No.: US 6,366,603 B1
(45) Date of Patent: Apr. 2, 2002

(54) SPREAD SPECTRUM COMMUNICATION SYSTEM

(75) Inventors: Yoshitaka Uchida; Takeshi Hashimoto; Katsuo Onozaki, all of Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/120,842

(22) Filed: Jul. 23, 1998

(30) Foreign Application Priority Data

Jul. 24, 1997 (JP) .............................. 9-214015

(51) Int. Cl.$^7$ .......................... H04B 15/00; H04K 1/00; H04L 27/30
(52) U.S. Cl. ..................... 375/136; 375/142; 375/150
(58) Field of Search .................. 375/136, 137, 375/142, 143, 147, 150, 316, 343, 364, 367, 368; 340/825.52; 370/341, 332, 349, 432, 431, 474, 475, 509, 514

(56) References Cited

U.S. PATENT DOCUMENTS 5,210,772 A * 5/1993 Nakagawa ..................... 375/1
5,323,236 A * 6/1994 Tichelaar et al. ........... 358/141
5,537,396 A * 7/1996 Kanda et al. .................. 370/18

FOREIGN PATENT DOCUMENTS

JP 8-149047 7/1998

* cited by examiner

Primary Examiner—Mohammad H. Ghayour
(74) Attorney, Agent, or Firm—McGinn & Gibb, PLLC (57) ABSTRACT

A spread spectrum communication system including a transmission side for transmitting a frame-structured transmission signal containing at least one preamble (having information on a transmission destination) and data subsequent to the preamble(s) while spread-spectrum-modulating the transmission signal with a PN code, and a reception side having a correlator for performing correlation between the PN code of the transmission signal and a reference PN code and a PN code generator for generating the reference PN code. At the reception side, the PN code of the preamble of the transmission signal and the reference PN code are correlated with each other to obtain correlation peaks, and the periodicity of the correlation peaks is detected and a prescribed number of correlation peaks is counted, thereby identifying the transmission signal as being addressed to the receiver.

30 Claims, 9 Drawing Sheets

SPREAD SPECTRUM COMMUNICATION SYSTEM

BACKGROUND OF THE INVENTION

1. Field of the Invention

The present invention relates to a spread spectrum communication system which is applicable to various radio (wireless) network systems, and particularly to a spread spectrum communication system which can be surely operated even under an unfavorable (severe) radio-wave condition.

2. Description of the Related Art

As a system for performing data communications in a radio (wireless) fashion are well known various systems in which a personal computer and a printer, for example, are linked to each other through a radio circuit, and print data created by the personal computer are transmitted to the printer to carry out a print operation. In order to exclude an effect of fading and ensure a desired communication distance, the above systems have frequently used a spread spectrum communication system (SSC) in which a spread spectrum (SS) modulation system is used as a system for modulating electric waves associated with information to be transmitted.

In the above-described spread spectrum communication system, at a transmission side the spectrum (frequency components) of an information signal to be transmitted is spread (bandwidth is increased) by using a PN (Pseudo Noise) code which has a much higher variation rate (i.e., a higher chip rate) than the information signal (i.e., bit rate). Further, at a reception side, a reference PN code which is coincident with the PN code of the transmission side is used, and the PN code of the transmission side and the reference PN code of the reception side are correlated with each other to demodulate the original information signal.

The PN code is a kind of cipher which is composed of a combination (sequence) of digital signals "1" and "0". For example, a PN code having a long period has an irregular repetitive pattern of "1" and "0", and thus it appears to be noise. Therefore, a third party cannot intercept an information signal mixed with such a PN code.

However, the above-described data communication system has a problem that a destination to which data is to be transmitted cannot be identified unless the data are demodulated. In the data communication system as described above, the data are generally designed in an 8-bit data configuration, and address information representing a destination to which the data are to be transmitted is contained in the data portion. Accordingly, the reception side cannot check whether the data are addressed thereto unless the reception side checks the address information in the data portion decoded (demodulated) after synchronization acquisition. This is a factor of lowering the data access efficiency. In addition, since the data are designed in an 8-bit data configuration as described above, the number of destinations to which data can be transmitted, that is, the number of channels is limited to 256 (=$2^8$).

In order to solve the above problem, Japanese Patent Application No. Hei-6-308293 (Japanese Laid-open Patent Application No. Hei-8-149047) proposes a technique for detecting a destination at a high speed without demodulating data.

According to this technique, a code representing a destination is input in a preamble locating before data to be transmitted, and code synchronization is carried out before demodulation of the data in order to identify the destination. Here, the code synchronization is defined as follows. When a transmission side transmits to a reception side a code group having PN codes which are different every period, the reception side receives the code group in time sequence to collate the code group with the reference PN code corresponding to the code group (i.e., upon viewing from the reception side, special PN code sequences each of which is allocated to each reception side are transmitted). In this case, if correlation peaks between the code group and the reference PN code can be obtained over all the periods (i.e., four periods), the reception side can automatically recognize that the signal containing the code group is addressed to the reception side itself (i.e., the code synchronization is established). Here, the code group is predetermined for each reception side (receiver), and each code group corresponds to a channel. For example, assuming that the code group comprises PN codes of four periods and each PN code has 31 chips at one period, totally $31^2$=923521 logical channels can be formed.

In this case, some threshold level must be set to detect correlation peaks between the signal transmitted from the transmission side and the signal at the reception side. However, under adversely varying electric-wave environments, the setting of the threshold value is difficult, and thus a malfunction occurs with high probability. Further, when the detection of the correlation peak between the signal at the transmission side and the signal at the reception side is performed with a threshold level, the setting of the level is cumbersome, and there may occur a case where a signal does not exceed the threshold level although it is a right signal.

Further, in this technique, in addition to the destination identifying code described above, a code for synchronization acquisition is also contained in the preamble, that is, plural codes are provided to the preamble, so that spurious occurs at the code switching time.

SUMMARY OF THE INVENTION

An object of the present invention is to provide a spread spectrum communication system which can solve the above problem of the prior art by using a transmission signal which is constructed so as to enable high-speed media access, so that a destination to which data is to be transmitted can be specified prior to demodulation of the data even under an unfavorable electric-wave environment.

In order to attain the above object, according to a first aspect of the present invention, a spread spectrum communication system includes a transmission side for performing spread-spectrum modulation using a pseudo noise (PN) code on a frame-structured transmission signal having at least one preamble and a data portion subsequent to the at least one preamble, and a reception side for receiving the transmission signal which is subjected to the spread-spectrum modulation at the transmission side, wherein the reception side includes destination identifying means for detecting the periodicity of the correlation peaks between the PN code in the at least one preamble of the transmission signal and a reference pseudo noise code generated at said reception side to count a prescribed number of correlation peaks, and checking on the basis of the counted number of correlation peaks whether the transmission signal is addressed to the reception side.

According to a second aspect of the present invention, a spread spectrum communication system includes a transmitter for performing spread-spectrum modulation using a pseudo noise (PN) code on a frame-structured transmission signal having data to be transmitted subsequently to at least one preamble(s), and reception means for receiving the transmission signal which has been subjected to the spread-spectrum modulation, wherein the reception means includes means for detecting the periodicity of the correlation peaks between the PN code in the preamble(s) of the transmission signal and a reference pseudo noise code to count a prescribed number of correlation peaks.

According to the first and second aspects of the present invention, the above-described spread spectrum communication system is provided with the means for detecting the periodicity of the correlation peaks between the PN code in the preamble(s) of the transmission signal and the reference PN code without setting a threshold level and counting the prescribed number of correlation peaks. Upon counting the prescribed number of correlation peaks (i.e., detecting the continuous periodicity of the correlation peaks between the code group of the preamble(s) and the reference PN code), the reception side can automatically specify the transmission destination (i.e., the reception side can recognize that the transmission signal containing the preamble(s) is address to the reception side itself). Accordingly, the communications can be performed by merely counting the number of correlation peaks before the data portion is demodulated. Therefore, even under an unfavorable electric-wave environment, high-speed media access can be surely performed.

In the above-described spread spectrum communication system, plural preambles may be provided to the transmission signal. In this case, the respective PN codes in the respective preambles may be designed to be coincident with one another, but to be shifted in phase from one another.

In the above case, the transmission signal is provided with the plural preambles, and the periodicity of the correlation peaks between the PN code in each preamble and the reference PN code is detected to count the prescribed number of correlation peaks. Accordingly, even when an interfering electric wave has some periodicity, a transmission destination can be specified for data communication before the data portion is demodulated, and high-speed media access can be accurately performed even under an unfavorable electric-wave environment. The reason is as follows. The PN codes of any two preambles (adjacent two preambles) are set to be different in phase, and thus the appearance time (position) of each correlation peak is different between the preambles because of the difference in phase of the preambles. Accordingly, the behavior of the appearance time (position) of the correlation peaks which is caused by the phase difference between the preambles is different from that of the correlation peaks caused by the periodic interfering electric wave.

DETAILED DESCRIPTION OF THE PREFERRED EMBODIMENT

A preferred embodiment according to the present invention will be described hereunder with reference to the accompanying drawings.

Figure 1:
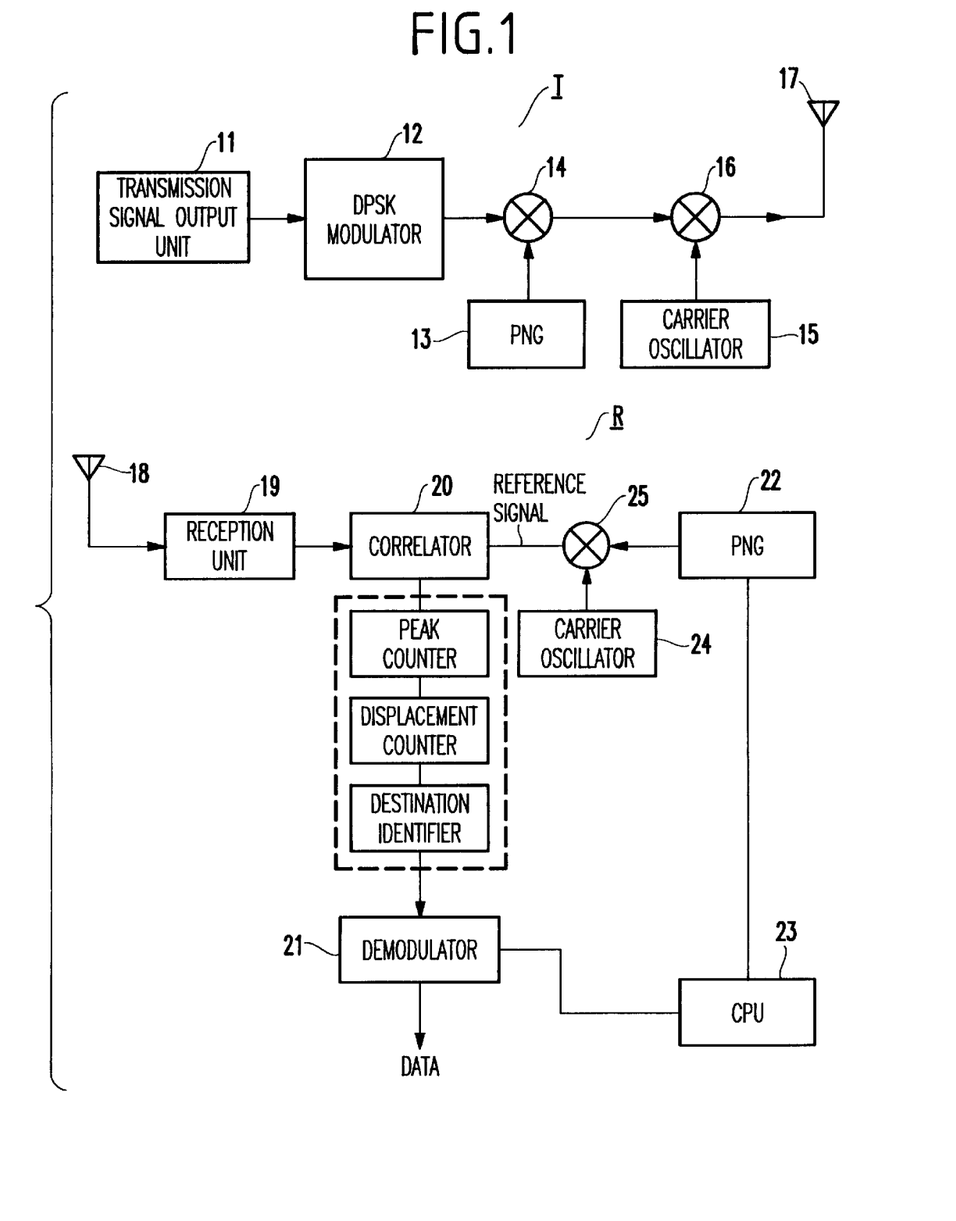
FIG. 1 is a block diagram showing an embodiment of a spread spectrum communication system according to the present invention.

FIG. 1 is a block diagram showing an embodiment of a spread spectrum communication system according to the present invention.

In FIG. 1, a transmitter T includes a transmission signal output unit 11, a DPSK (Differentially Encoded Phase Shift Keying) modulator 12, a PN (Pseudo Noise) code generator (hereinafter referred to as "PNG") 13, a multiplier 14, a carrier oscillator 15, a multiplier 16 and a transmission antenna 17. Further, a receiver R includes a reception antenna 18, a reception unit 19 comprising an RF amplifier (reproduction signal amplifier), an IF amplifier, etc., a correlator 20, a demodulator 21, a reference PN code generator 22 (hereinafter referred to as "reference PNG"), a controller 23 such as CPU or the like, a carrier oscillator 24 and a multiplier 25. The PN code of the reference PNG 22 is obtained by timely inverting the same PN code as PN code received from the transmitter T.

Figure 3:
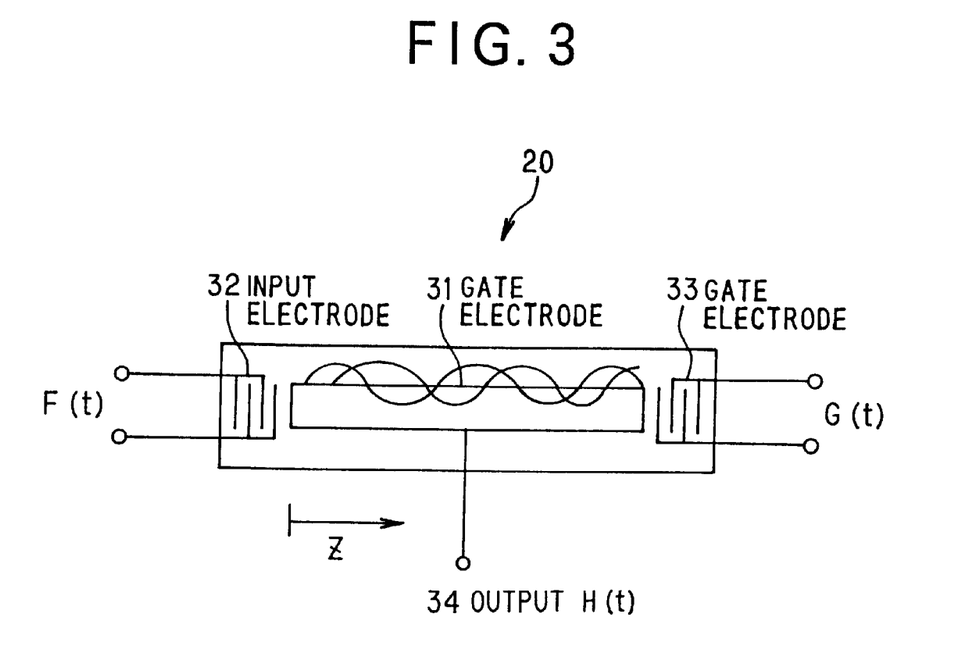
FIG. 3 is a diagram showing an example of a SAW convolver.

The correlator 20 comprises a convolver 20, and it has a gate electrode 31, two input electrodes 32, 33 and an output electrode 34 as shown in FIG. 3. In this case, a double gate convolver is used as the correlator 20. This convolver is a correlation detector using a convolution integrator (convolver) based on surface acoustic wave (i.e., SAW). In the convolver, an input signal F(t) and a reference signal G(t) are input to a delay circuit to perform multiplication and integration on the input and output signals which are shifted in time from each other. Here, if a signal obtained by inverting the input signal in time is used as the reference signal, an auto-correlation output peak can be obtained at the output electrode 34 of the convolver.

Figure 2:
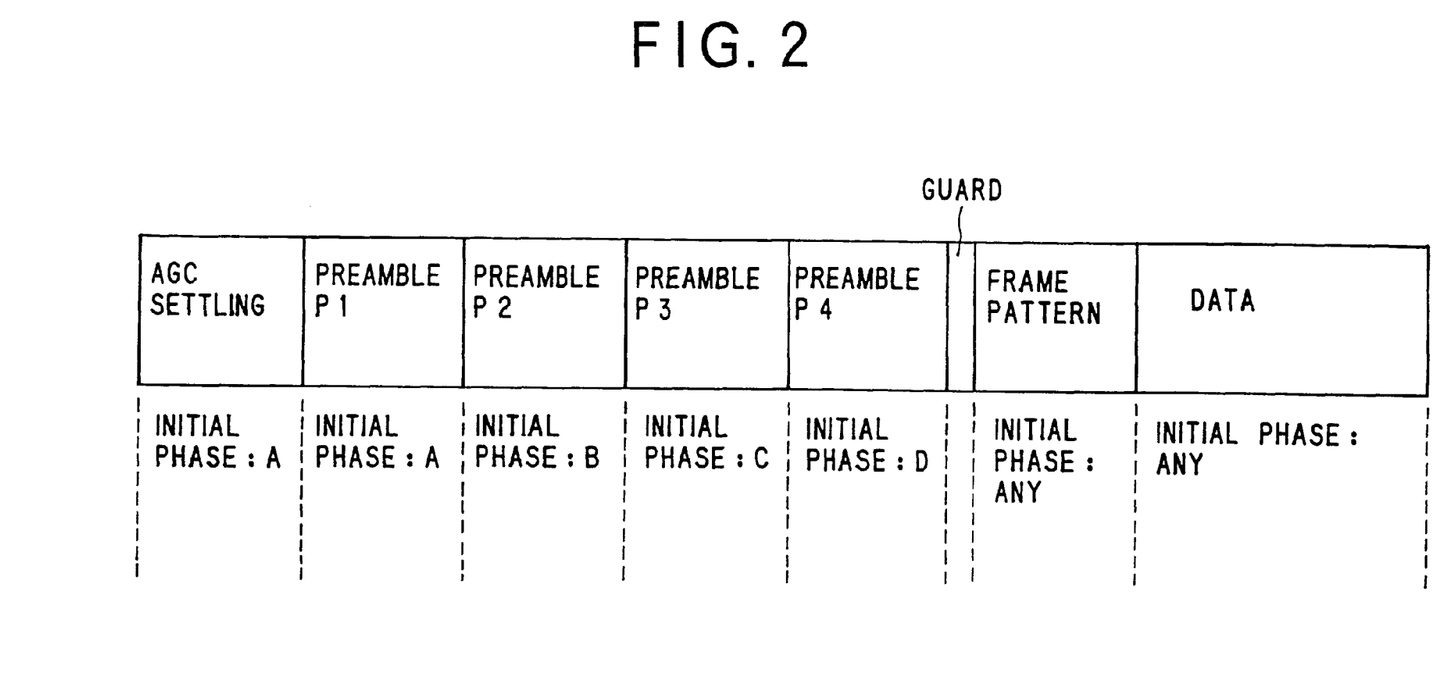
FIG. 2 is a diagram showing an example of the frame structure of a transmission signal used in the present invention.

FIG. 2 is a diagram showing the frame structure of the transmission signal of the spread spectrum communication system. According to the frame structure of this embodiment, a frame pattern and a data portion are provided subsequently to an AGC (Auto Gain Controller) settling unit for setting an initial state and plural preambles (P1, P2, P3, 4). The respective preambles P1, P2, P3, P4 are designed to have the same PN code, but the PN codes of these preambles may be shifted in phase or be in phase.

According to this embodiment, the periodicity of correlation peaks output from each of the preambles P1, P2, P3, P4 (i.e., the periodicity of correlation peaks obtained by the correlation between the PN code of each preamble and the reference PN code) is detected to count the number of correlation peaks. When the count value of the correlation peaks in each preamble is equal to a predetermined number and also the code phase difference (the phase difference of PN codes) between adjacent preambles is coincident for all the preambles, the code synchronization is performed. Here, the number of chips of the PN code being used may be set to any value on the basis of a spreading bandwidth of a transmission signal, a delay time determined by the gate length of the convolver, etc.

Figure 4A:
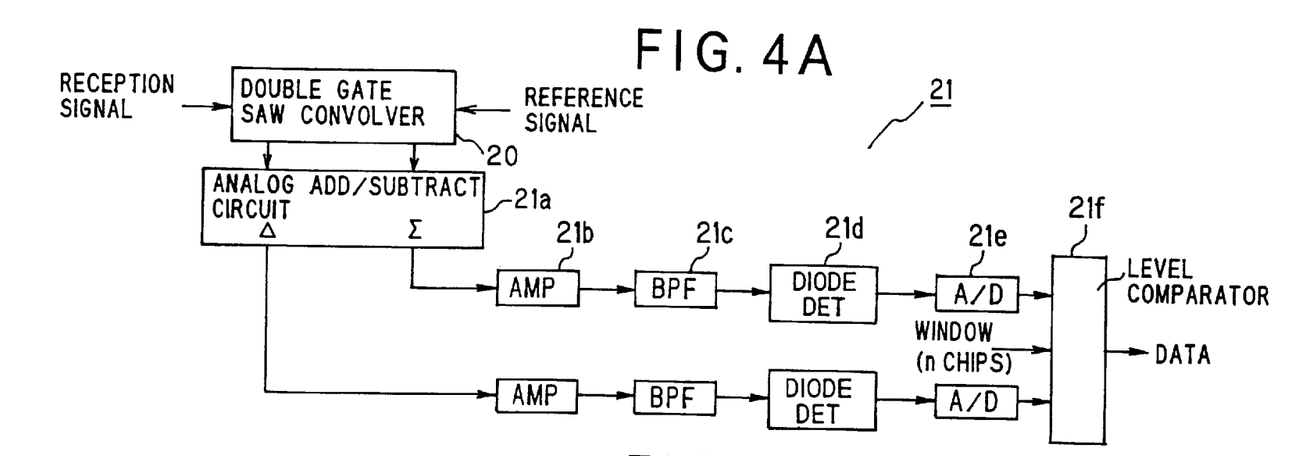
FIGS. 4A and 4B are diagrams showing the construction of a decoder.
Figure 4B:
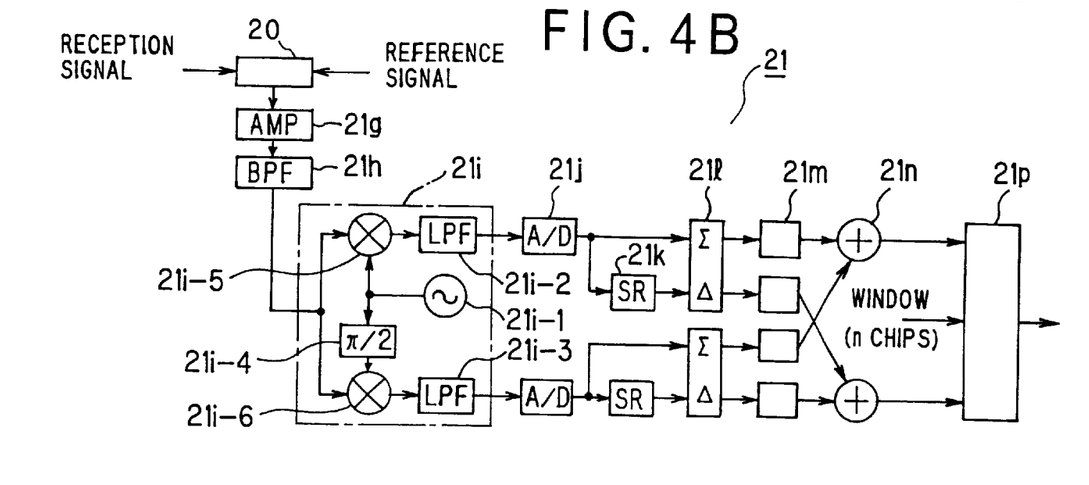

FIG. 4A and 4B are diagrams showing examples of the demodulator 21. FIG. 4A shows the construction based on a DPSK analog detection system using a double gate convolver as the correlator 20, which comprises an analog add/subtraction circuit 21a, an amplifier 21b, a band pass filter (BPF) 21c, a diode detector 21d, an A/D converter 21e, and a level comparator 21f. FIG. 4B shows the construction of a DPSK digital add/subtraction detection system using a double gate convolver as the correlator 20, which comprises an amplifier 21g, a BPF 21h, an I-Q detection circuit 21i, an A/D converter 21j, a shift register (SR) 21k, a digital add/subtraction circuit 21l, a square circuit 21m, an add circuit 21n, and a level comparator 21p. The I-Q detection circuit 21I comprises a local oscillator 21i-1, low-pass filters (LPF) 21i-2, 3, a $\pi/2$ phase shifter 21i-4, and multipliers 21i-5, 6.

Figure 5:
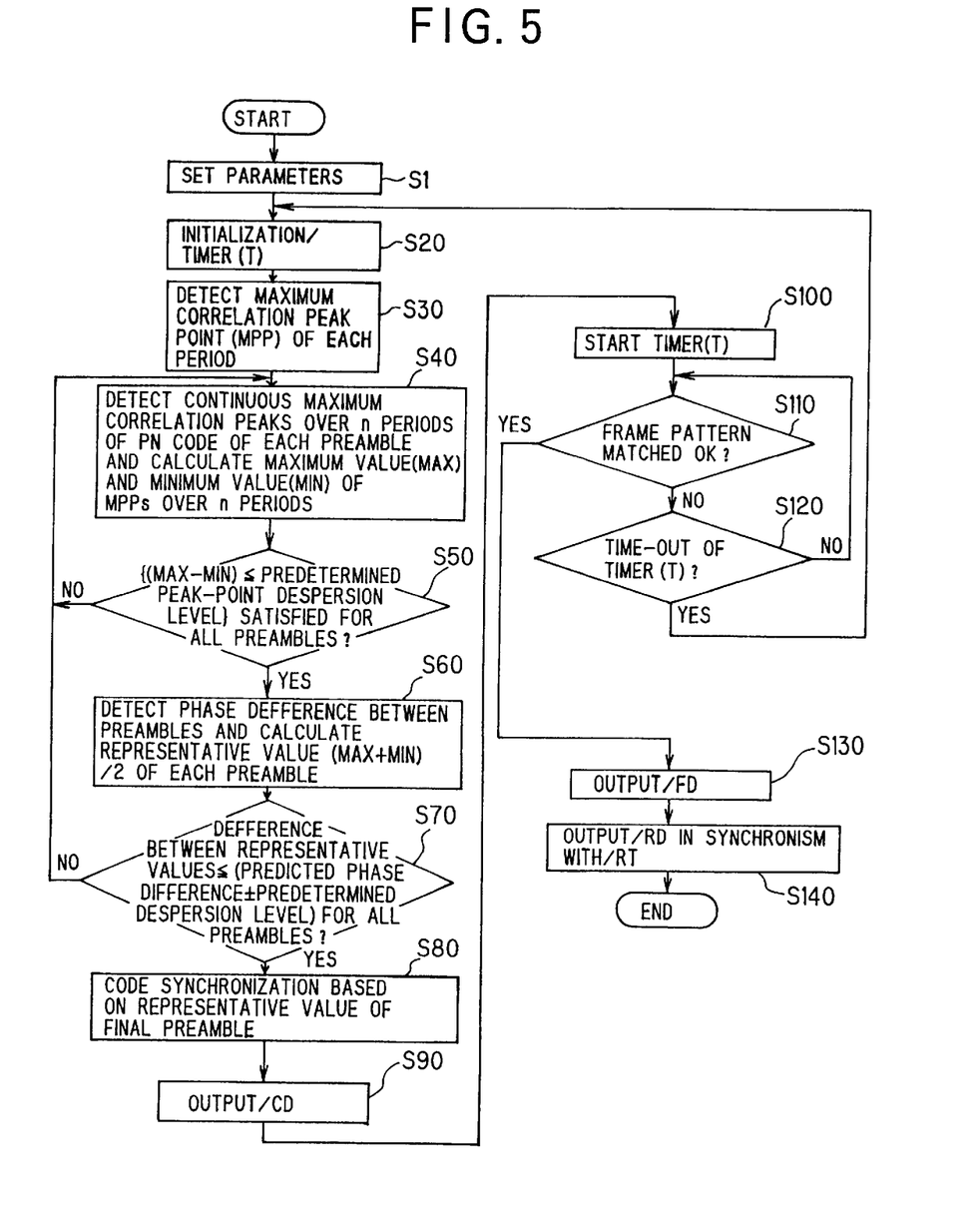
FIG. 5 is a flowchart showing signal processing.

FIG. 5 is a flowchart showing the signal processing for performing the code synchronization when the periodicity of the correlation peaks obtained for each of the preambles P1, P2, P3, P4 shown in FIG. 2 is detected and a predetermined number of correlation peaks is counted, and also the code phase differences between respective two adjacent preambles of all the preambles P1, P2, P3, P4 (i.e., the code phase difference between the preambles P1 and P2, the code phase difference between the preambles P2 and P3, the code phase difference between the preambles P3 and P4) are coincident with one another.

In step S1 of FIG. 5, desired parameters are set, and in step S20 initialization (reset of a timer) is performed. In steps S1, S20, the initialization is performed to reset the timer to zero.

Figure 7:
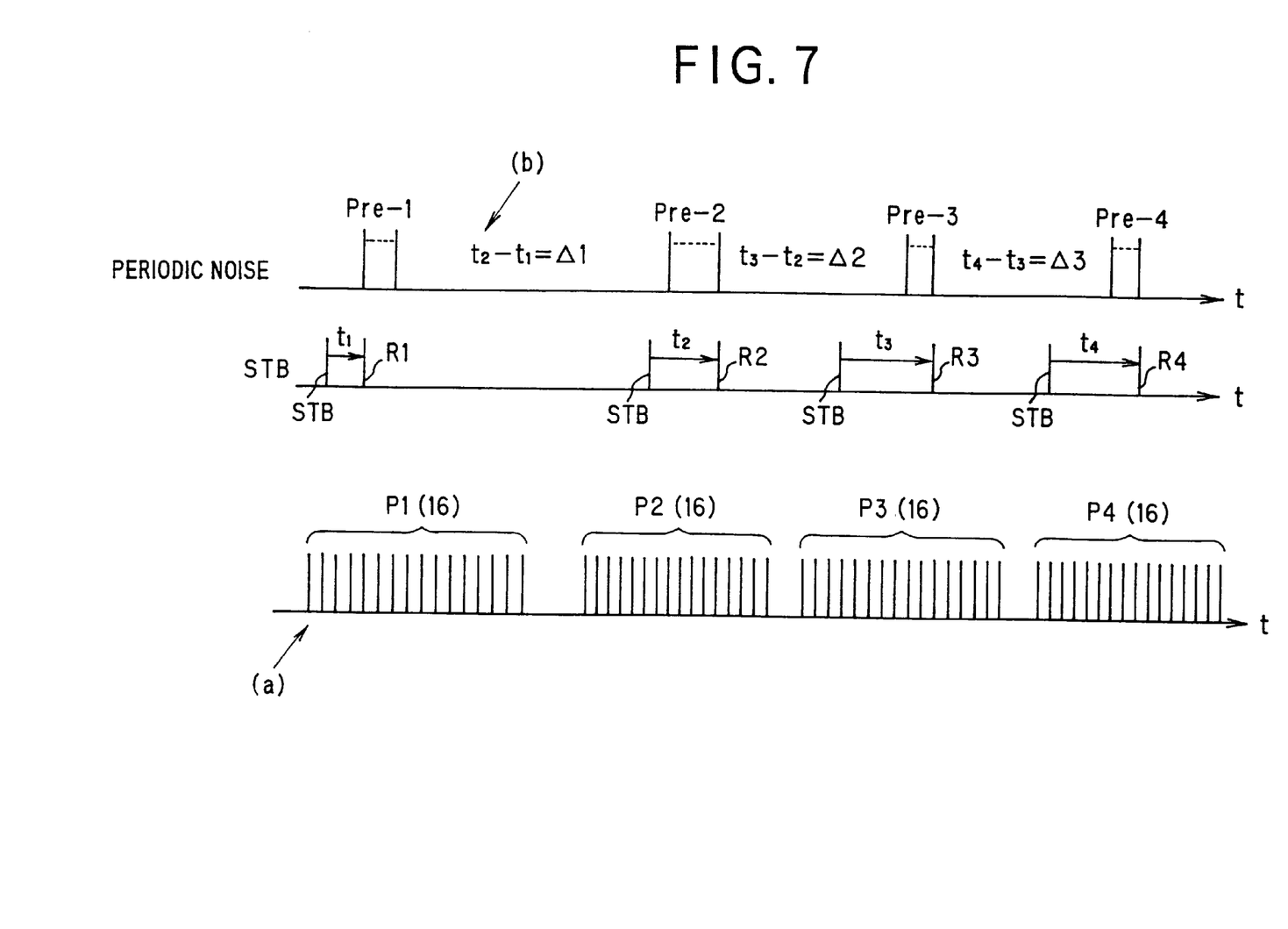
FIG. 7 is a diagram showing a PN code, etc. in frames of the signal.

In step S30, the maximum correlation peak points (MPP) each of which appears at any position (time) every period of the PN code are successively detected for each preamble. Here, each preamble contains PN code of m periods, and m periods of the PN code corresponds to the time length of each preamble. MPP is defined as a point (position or time) at which the maximum correlation peak is obtained over one period of the PN code, and it is calculated on the basis of the absolute time defined in the reception side (described later). Here, (a) of FIG. 7 shows a sequence of maximum correlation peaks obtained over m periods of the PN code in each preamble (P1, P2, P3, P4). Subsequently, in step S40, continuous correlation peaks (i.e., the MPPs of the continuous correlation peaks) over any n periods of the PN code in each preamble are detected as shown in FIG. 7.

In this case, it is assumed that m is set to 18 and n is set to 8. Accordingly, as indicated by (a) of FIG. 17, sixteen maximum correlation peaks are detected for each preamble P1, P2, P3, P4, and only one maximum correlation peak appears in each period of the PN code. As described above, only one maximum correlation peak point (MPP) is obtained in one period of the PN code, and thus the "continuous correlation peaks over n periods of the PN code" means a sequence of maximum correlation peaks (MPP) which appear continuously over n periods of the PN code. The "n periods of the PN code" for which continuous correlation peaks are detected is not limited to a special period, and it may be set to any n periods. The operation of detecting the continuous correlation peaks over n periods is repeated until the continuous correlation peaks over n periods can be obtained until the process reaches the final period of the m periods of the PN code.

Ideally, each of the maximum correlation peaks appears at the same position at all times in each period of the PN code and thus there is no dispersion in MPP among these maximum correlation peaks. However, actually, the maximum correlation peaks appear at different positions over n periods because of various noises or interfering electric waves, and thus the degree of the dispersion in MPP over n periods of the PN code is determined. This dispersion degree is determined by using the maximum and minimum values of MPPs which are calculated from the MPPs over n periods of the PN code (i.e., the maximum and minimum displacements of the MPPs detected over n periods of the PN code from a reference position (which is called as "STB (start bit)" as described later), or the maximum and minimum time shifts from a reference time (i.e., STB). That is, from the maximum correlation peak points (MPPs) thus obtained over n periods of the PN code in each preamble, the maximum position (MAX) and the minimum position (MIN) of the MPPs over n periods of the PN code in each preamble are calculated on the basis of the absolute time of the reception side.

In this embodiment, the maximum correlation peak points (MPPs) in each preamble are expressed by using count numbers which are set in the reception side. In other words, the absolute time of the reception side can be expressed by the count numbers. STB (start bit) corresponds to the counter number of "1", and it is generated every period of the PN code. Only one maximum correlation peak occurs in each period of the PN code, and the position of the maximum correlation peak (i.e., MPP) in each period of the PN code is expressed by a count number on the basis of the STB (i.e., increments from STB). For example, assuming that the count numbers from "1"(STB) to "23" are allocated to one period of the PN code (i.e., the absolute time in each period of the PN code is expressed by one of these count numbers from "1" to "23"), each of the MPPs in each preamble is expressed by using one of these count numbers. For example, when a first maximum correlation peak (i.e., the maximum correlation peak at a first period of n periods) is detected at a count number of "3", the subsequent maximum correlation peaks (i.e., the maximum correlation peaks at subsequent periods) are ideally detected at the same count number of "3". However, actually, the subsequent maximum correlation peaks are detected at different count numbers. Accordingly, (MAX−MIN) of the maximum correlation peaks corresponds to the value obtained by subtracting the count number of MIN from the count number of MAX, and means the dispersion range of the MPPs detected over n periods of the PN code. For example, when MAX is equal to "8" in count number and MIN is equal to "3", MAX−MIN=5. That is, the dispersion range is equal to 5.

In this embodiment, the number of the preambles is set to 4 in FIG. 2. The steps S30 and S40 correspond to the detection and calculation processing of the maximum correlation peak points over n periods of the PN code for the portion indicated by (a) of FIG. 7.

In step 50, the continuity and periodicity of the continuous maximum correlation peaks (i.e., MPPs) is checked. Specifically, it is checked whether the difference between the maximum point (MAX) and the minimum point (MIN) of MPPs over n periods of the PN code satisfies the following inequality for all the preambles: (MAX−MIN)≦(a predetermined peak-point dispersion value). If the above inequality is satisfied, the continuity and periodicity of the maximum correlation peaks is judged and the processing goes to step S60. On the other hand, if the difference (MAX−MIN) is not within the above predetermined peak-point dispersion range, that is, if the continuity of the maximum correlation peaks is judged to be defective, the processing returns to the step S40 to execute the processing of step S40 for another n-period of the PN code again.

In step S60, the phase difference between the respective adjacent preambles is actually detected by using representative values of the preambles which are expressed by (MAX+MIN)/2. The representative value (position) of each preamble which is expressed by (MAX+MIN)/2 may be regarded as the substantial position (time) at which a sequence of continuous and periodic maximum correlation peaks is detected for each preamble. Accordingly, the difference between the representative values of the respective adjacent preambles is defined as an actually measured (calculated) phase difference between the adjacent preambles concerned.

In step S70, it is checked whether the inequality: the difference of the representative values between the respective two adjacent preambles≦(phase difference±predetermined dispersion range) is satisfied. Here, "phase difference" at the right side of the inequality is known because the phase difference between the PN codes of the respective preambles is preset at the transmission side and the reception side. That is, at the transmission side, the relationship of the phase difference between the PN codes of the respective preambles is set to a predetermined one. However, when these preambles are received at the reception side, this phase-difference relationship is effected by various noises or interfering electric wave and finally it is varied to a different phase-difference relationship. The step 70 is the processing of checking whether the phase-difference relationship thus varied is deviated from the predetermined phase-difference relationship at transmission side (reception side) by a predetermined dispersion level or less.

In FIG. 7, "STB" represents the start point of the absolute time of the reception side every period of the PN code. In FIG. 7, it is assumed that the representative values (R1, R2, R3, R4) of the respective preambles P1, P2, P3, P4 are detected at t1, t2, t3, t4 from STB. Accordingly, the actually-measured phase difference between the preambles P1 and P2 corresponds to the difference Δ1 between t1 and t2, the actually-measured phase difference between the preambles P2 and P3 corresponds to the difference Δ2 between t2 and t3, and the actually-measured phase difference between the preambles P3 and P4 corresponds to the difference Δ3 between t3 and t4. Accordingly, the above inequality is equivalent to the judgment as to whether all of Δ1, Δ2, Δ3 are within (preset phase difference±predetermined dispersion range).

If the inequality is not satisfied, the processing returns to the step S40 to repeat the processing of the steps S40 to S70.

If the phase-difference dispersion between the respective adjacent preambles is within the range determined by the inequality of the step S70 although a periodic noise (interfering electric wave) is contaminated in the PN code of the preamble, the processing goes to step S80. This processing is carried out because the probability that some periodic noise is contained cannot be nullified by merely suppressing the dispersion range (MAX−MIN) of the continuous correlation peak points to be within the predetermined range in S50. Such a periodic noise occurs, for example, when another spread spectrum communication system using the same frequency band is actuated at a near place. Step 80 and subsequent steps are introduced on the assumption that some periodic noise is contained, and in these steps, the phase difference between the respective preambles is considered. The steps S60 and S70 pertain to the processing on the portion indicated by (b) of FIG. 7. The steps S40 to S70 are set to be in operation at all times and operate immediately after time-out.

In step S80, the code synchronization is performed on the basis of the representative value of the final preamble. That is, synchronization acquisition is performed to match the phase of the received signal and the phase of the reference PN code on the convolver in order to reproduce the original data from the modulated signal. In step S90, a code detect signal (/CD) representing an initial synchronization detection status, that is, presenting that the phase synchronization between the reference PN code and the received packet is established is output. That is, the steps S80 and S90 correspond to the processing of shifting to the code synchronization if the phase difference between the preambles is judged to satisfy the predetermined condition subsequently to the judgment on the continuity.

In step S100, the time (T) of the step S20 is started. In the case where a frame pattern matching in step S110 can be performed, the processing goes to step S130. On the other hand, in the case where the frame pattern matching in step S110 cannot be performed, the processing returns to the step S110 if the timer (T) is not time-out in step S120 or returns to the step S20 if the timer (T) is time-out, thereby retrying all the processing of the step S20 and the subsequent steps. The timer of S100 is a timer which is used during the frame detection. Such a time-out situation in spite of the completion of the processing until the code synchronization may often occur under some electric-wave environments.

In step S130, a frame detection signal (/FD) representing a frame synchronization detection status (i.e., representing that a start point of the data portion in a received packet is detected) is output, and receive data (RD) is output in synchronism with a receive timing clock (RT) in step S140. The steps S110, S130 and S140 correspond to the stage of shifting to the data demodulation.

As described above, the respective preambles PR1, PR2, PR3, PR4 of FIG. 2 use the same PN pattern, and only the phase is different among the PN patterns of these preambles.

Figure 6:
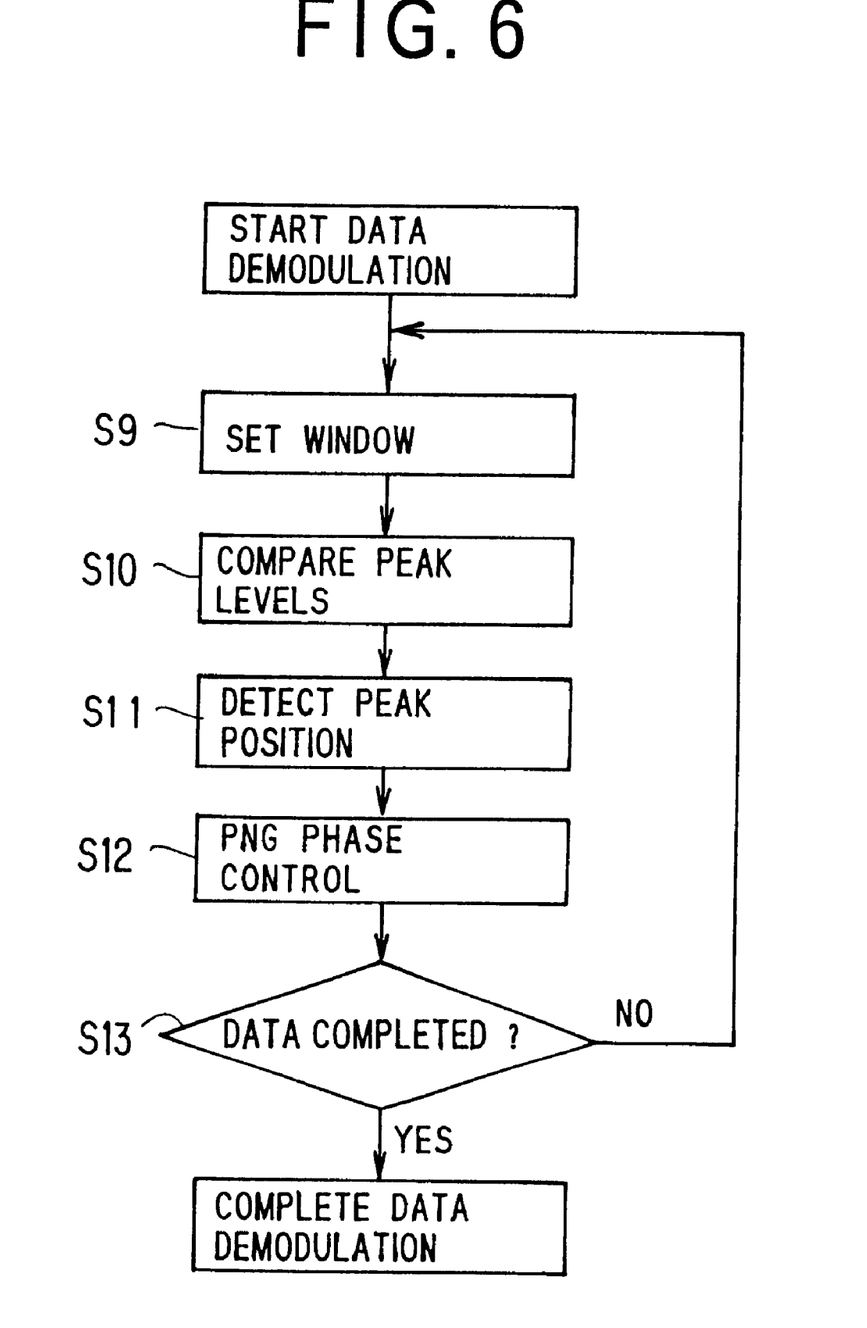
FIG. 6 is a flowchart showing a data demodulation operation sequence.

FIG. 6 is a flowchart showing a sequence of the data demodulating operation. In the following description, it is assumed that the data modulation at the transmission side is carried out by using DPSK (Differentially Encoded Phase Shift Keying), and thus the reception side uses an add(sum)/subtract detection system as means for performing the data demodulation simultaneously with the synchronization acquisition of the PN code in correlators. Specifically, in the add/subtraction detection system of this embodiment, two correlators (convolvers) are serially connected to each other, and the gate length of each convolver is set to be equal to the one period of the PN code. The outputs of the respective convolvers are added with each other and output as an add signal. Further, the outputs of the respective convolvers are subtracted from each other and output as a subtract signal. The add signal and the subtract signal represent the polarities of the data ("1" and "0"), respectively. The data are expressed by binary values of "1" and "0", and comprises a serial signal. Accordingly, the data at a time is expressed by any one of "1" and "0", and thus a correlation peak is obtained from any one of the add signal and the subtract signal at all times. In other words, by comparing the peak levels of the add signal and the subtract signal (i.e., checking which one of the add signal and the subtract signal contributes to the correlation peak), the data can be demodulated.

In addition, by checking the peak levels of the add signal and the subtract signal, the position of the correlation peak can be known at all times.

In step S9, a window for the data demodulation is set with the correlation peak for the synchronization acquisition and channel identification sequence being set at the center of the window. In step S10, the peak levels of the add ($\Sigma$) signal and the subtract ($\Delta$) signal are compared with each other. In step S11, the correlation peak position in the window is detected on the basis of the comparison result of the add and subtract signals. In step S12, the phase control of PNG 22 is performed in accordance with the correlation peak position thus detected. In step S13, the above data demodulating operation is repeated until the operation on all the data is completed. The phase control of the step S12 may be omitted in connection with the data rate.

Next, the details of checking the dispersion range of actually-measured phase difference between preambles in step S70 will be described.

A register is used to set the dispersion range of the phase difference between the preambles, and for example, the range from 0 to 15 (4 bits) is set. On the basis of the calculation, it is checked whether the actually-measured phase difference between adjacent preambles (which is expressed by the difference of the representative values of the preambles in step S70) is deviated from a predicted correlation peak position by a preset dispersion range in a plus or minus direction. Here, the predicted correlation peak position can be calculated on the basis of the phase difference data between the preambles which is set by another register. If all the phase differences between the respective preambles are detected to be within the preset dispersion range, a certain output terminal is set to "H" level (asynchronous output). Accordingly, this means that the continuity and periodicity of the maximum correlation peak positions are satisfied and the actually-measured phase differences between the preambles are detected to be within the preset dispersion range. Therefore, the communication system (MDM2) using the convolvers in step S90 of FIG. 5 outputs the code detect signal (/CD) and shifts the processing from the initial synchronization process to the data demodulation process of the step S100 and the subsequent steps.

Next, the setting of an edge judgment threshold value when the continuity and periodicity judgment of maximum correlation peak positions (MPPs) in step S50 is carried out will be described.

Figure 8:
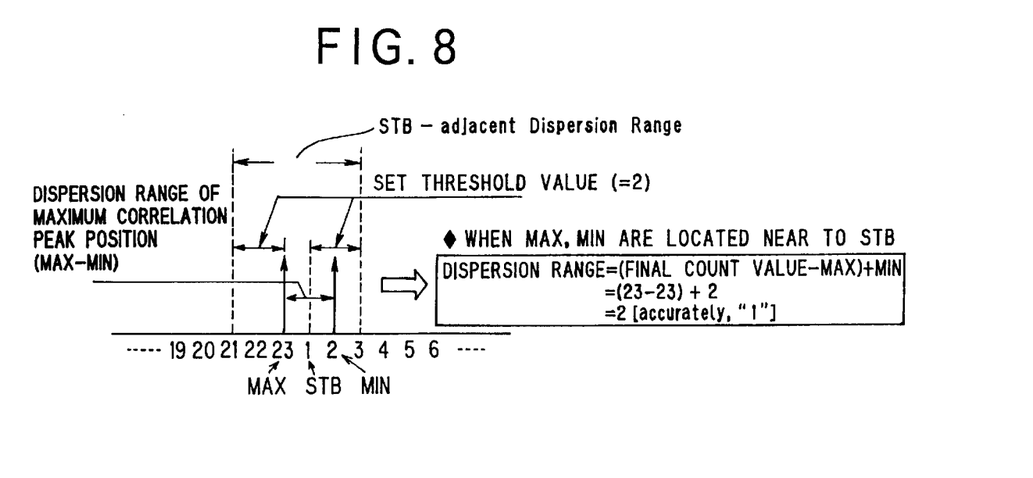
FIG. 8 is a diagram showing a manner of determining a dispersion range in an judgment on the continuous periodicity of the positions of maximum correlation peaks.

FIG. 8 is a diagram showing a way of calculating the dispersion range (MAX−MIN) in the continuity and periodicity judgment of the maximum correlation peak positions in step S50.

In the step of calculating the dispersion range (MAX−MIN) in the continuity and periodicity judgment of the maximum correlation peak positions, when maximum correlation peak positions are detected across a STB, the dispersion range (MAX−MIN) cannot be simply calculated, and special processing is needed. Accordingly, a threshold value as described later is introduced to give a selection condition as to which processing should be selected to calculate the dispersion range (MAX−MIN). The threshold value is set to any value from 0 to 15 (4 bits) (resolution is dependent on system clocks), and two threshold values are provided with respect to the STB.

For example, it is assumed that "2" is set as the threshold value and MAX and MIN of continuous maximum correlation peaks over n periods of the PN code are detected at a count number "23" of a period and at a count number "2" at the next period as shown in FIG. 8. As described above, STB is set to the count number "1". In this case, it is possible to calculate the dispersion range (MAX−MIN) by two ways. One way resides in that the dispersion range (MAX−MIN) is simply equal to the difference between MAX and MIN (23−2=21). The other way resides in that the dispersion is regarded as occurring in the neighborhood of the STB (count number "1"). In this case, the threshold value "2" is used to select one of the above two ways. That is, the range from the count number "21" (which is decremented from the final count number "23" by the threshold value "2") to the count number "3" (which is incremented from STB ("1") by the threshold value "2" is set as a STB-adjacent dispersion range. Therefore, if MAX and MIN are located within this dispersion range (from "21" to "3" (in the case of FIG. 8, since MAX="23" and MIN="2", this condition is satisfied), the latter calculation way is selected. Accordingly, if the latter calculation way is selected, the dispersion range (MAX−MIN) is calculated from the following equation:

Dispersion range=(final count number−MAX)+MIN=(23−23)+2=2 (accurately, "1")

When the continuity of the maximum correlation peaks is detected and all the maximum correlation peak points (MPPs) are located in the above STB-adjacent dispersion range, the above calculation processing (the latter calculation way) is carried out to obtain the dispersion range (MAX−MIN) as shown in FIG. 8.

Next, a set value for delaying STB will be described.

After the code detect signal (/CD) is output in step S90 of FIG. 7, the communication system generates a window in the data demodulation process. The window is generated for STB on the basis of the set position and width information. However, a window extending across STB cannot be generated. Therefore, in order to support the maximum correlation peaks which are detected across STB, temporary STB (Variable-STB) which is delayed from normal STB (Normal-STB) by several chips is prepared. Accordingly, in the data demodulation processing, the maximum correlation peak positions are apparently shifted so that they are not detected across STB, and a window can be generated at a suitable place.

If the synchronization acquisition is normally carried out, the peak position in the data demodulation process can be uniquely determined. Accordingly, once the optimum delay value of V-STB is determined, no change is required to this register afterwards. Further, after the synchronization acquisition, "0" setting (the delay value is set to zero) is left when the maximum correlation peak points are not located across STB (N-STB). The reference PN code for the convolver is synchronized with N-STB at all times, and the signal processing is carried out in only ASIC while V-STB after synchronization acquisition is regarded as normal STB.

Figure 9:
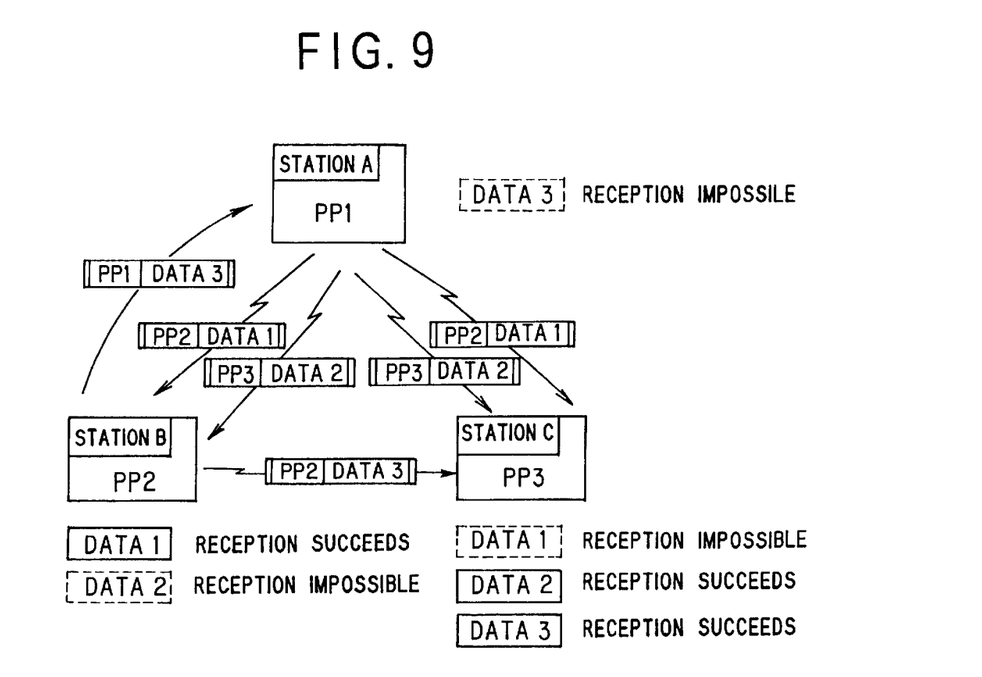
FIG. 9 is a diagram showing an equi-dispersion type data communication system.
Figure 10:
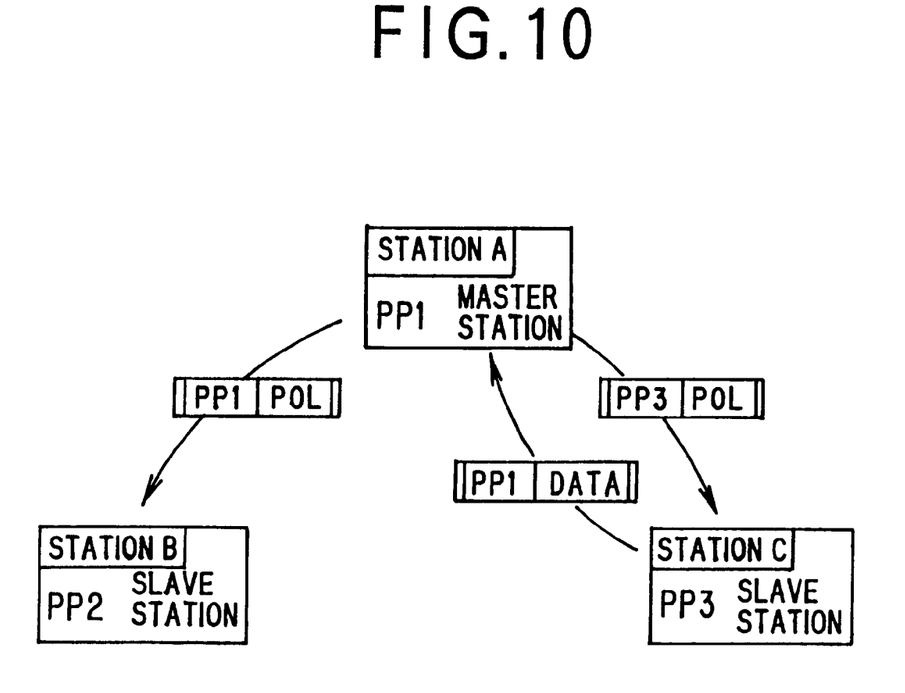
FIG. 10 is a schematic diagram showing a polling type data communication system.

FIGS. 9 and 10 are diagrams showing cases where the present invention is applied to various data communication systems.

FIG. 9 is a schematic diagram showing a equi-dispersion type data communication system to which the present invention is applied.

In FIG. 9, each of stations A to C is provided with the transceiver shown in FIG. 1, and these stations can mutually carry out communications with one another. The transmission destination identifiers (DA) of the stations A to C are represented by PP1 to PP3, respectively. By transmitting an RF frame in which an identification pattern for a transmission destination is set, the frame reception at other stations than a specific station can be excluded at the physical layer level of the system. Therefore, unlike the conventional communication systems, it is unnecessary to carry out a judgment process of temporarily receiving the RF frame and then analyzing a transmission destination identifier to judge whether the received data are should be abandoned. That is, all the data which can be received are judged to be addressed to the reception side itself, and thus the DA analysis processing can be omitted.

Accordingly, the algorithm of the signal processing at the data reception time can be simplified, and the processing time for the RF frame reception can be shortened. However, in a conventional equi-dispersion type network system, there is a risk that data from an adjacent service area are accidentally received (when the same DA is given), or that transmission data are intercepted. However, according to the system of the present invention, all the stations have different DAs, and thus the probability that the data are accidentally received or intercepted can be excluded at the physical layer level.

FIG. 10 is a schematic diagram showing a polling-type data communication system to which the present invention is applied.

In FIG. 10, each of stations A to C is provided with the transceiver as shown in FIG. 1, and these stations can mutually carry out communications with one another. The transmission destination identifiers (DA) of the stations A to C are represented by PP1 to PP3, respectively. When the polling type data communications are carried out, a master station A transmits a polling packet POL to each of slave stations B and C together with transmission destination identifiers PP1 to PP3. Each of the slave stations B and C is provided with a transmission plate at the time when receiving a polling packet POL, and if there are data to be transmitted, each slave station transmits the data. In the case of the polling system, the master station A fabricates and transmits the polling packet POL, and starts to receive data DATA from the slave stations B and C. If there is no data transmission from the slave stations B and C, the master station A carries out time-out processing. Here, the time period until a next polling packet is fabricated because of the time-out processing, that is, a time interval at which the polling packet can be transmitted, is called as "polling period". As the polling period is shorter, a system having a higher channel using efficiency can be designed.

In this embodiment, the detection of the correlation peaks of the PN code is performed without using any threshold level unlike the conventional technique. The reason for this is as follows:

(1) There is a probability that even when a correct signal is received, the signal does exceed the threshold level.

(2) When a noise exceeds the threshold level, the code synchronization is erroneously started, and thus the processing is theoretically considered as not shifting to the channel identification and subsequent steps permanently. It may be considered to shorten the timer, however, the time shortening is restricted because the timer needs several cycles. That is, if a correct signal comes again before the time is out (trigger is taken with code synchronization), the processing becomes "NG", and thus there is a probability that malfunction occurs in the course of the frame pattern (identification 2) subsequent to the preambles because the correct correlation peak positions are determined.

In this embodiment, such a high-speed media access that a transmission destination can be specified prior to demodulation of a data portion for communications without setting the threshold level for the correlation peaks by repeating one or plural preambles can be surely performed even under unfavorable electric-wave environments. The above embodiment is more effectively used under adverse electric-wave environments, and it may be used for radio communications between an instructing device and an manned transfer machine in a factory, a POS (point-of-sale) system, etc.

The present invention is not limited to the above embodiment, and various modifications may be made without departing from the subject matter of the present invention. For example, in FIG. 2, the four preambles are provided, however, the number of preambles may be set to 1, 2, 3, 5 or more.

In addition, the number (m) of the periods of the PN code which constitute each preamble and the number (n) of the periods of the PN code over which continuous maximum correlation peaks are detected are not limited to "16" and "8", and any values may be set for m and n insofar as m is equal to or larger than n.

As described above, according to the present invention, no threshold level is set, and there is provided with the means of detecting the periodicity of the correlation peaks and counting a prescribed number of correlation peaks. Therefore, the transmission destination can be specified prior to the demodulation of the data portion by merely counting the prescribed number of correlation peaks. Therefore, a high-speed media access can be surely performed even under unfavorable electric-wave environments.

Further, according to the present invention, a transmission signal is provided with plural preambles, and the periodicity of correlation peaks between the PN code of each preamble and the reference PN code is detected to count a prescribed number of correlation peaks. Therefore, even when an interfering electric wave has some periodicity, the transmission destination can be specified prior to the demodulation of the data portion. Therefore, a high-speed media access can be surely performed even under unfavorable electric-wave environments.

What is claimed is:

1. A spread spectrum communication system including:
   a transmission side for performing spread-spectrum modulation using a pseudo noise (PN) code on a frame-structured transmission signal comprising at least one preamble having information on a transmission destination and a data portion subsequent to the at least one preamble; and
   a reception side for receiving the transmission signal which is subjected to the spread-spectrum modulation at said transmission side, wherein said reception side includes destination identifying means for detecting the periodicity of the correlation peaks between the PN code in the at least one preamble of the transmission signal and a reference pseudo noise code generated at said reception side to count a prescribed number of correlation peaks, and checking on the basis of the counted number of correlation peaks whether the transmission signal is addressed to said reception side.

2. The spread spectrum communication system as claimed in claim 1, wherein said at least one preamble contains m periods of the PN code, and said destination identifying means includes count means of counting the number of maximum correlation peaks which are continuously obtained over n periods of the PN code, each maximum correlation peak being obtained every period of the PN code, said destination identifying means identifying the transmission signal as being addressed to said reception side when the counted number is equal to a predetermined number or more, where m and n represent positive integers satisfying (n≦m).

3. The spread spectrum communication system as claimed in claim 2, wherein said destination identifying means further includes MPP (maximum correlation peak position) dispersion check means for checking whether a dispersion range of the positions at which the continuous maximum correlation peaks are obtained over the n periods is within a predetermined dispersion range.

4. The spread spectrum communication system as claimed in claim 3, wherein the dispersion range of the positions of the continuous maximum correlation peaks (MPPs) is determined on the basis of the maximum and minimum positional displacements (represented by MAX and MIN) from a reference position in the continuous MPPs.

5. The spread spectrum communication system as claimed in claim 4, wherein said destination identifying means identifies the transmission signal as being addressed to said reception side when the counted number of said count means is equal to a predetermined number or more and also the difference (MAX−MIN) is within a predetermined MPP dispersion range.

6. The spread spectrum communication system as claimed in claim 5, wherein the transmission signal contains plural preambles which are serially arranged in the transmission signal, and when representing the value (MAX−MIN)/2 in each preamble as a representative value, said destination identifying means further includes phase difference check means for checking whether the difference between the representative values of respective adjacent preambles is within a predetermined phase-difference dispersion range for all the preambles.

7. The spread spectrum communication system as claimed in claim 6, wherein said destination identifying means identifies the transmission signal as being addressed to said reception side when the counted number of said count means is equal to the predetermined number or more, the difference (MAX−MIN) is within the predetermined MPP dispersion range, and the difference between the representative values of respective adjacent preambles is within the predetermined phase-difference dispersion range for all the preambles.

8. The spread spectrum communication system as claimed in claim 1, wherein said transmission signal contains plural preambles each of which contains a PN code.

9. The spread spectrum communication system as claimed in claim 8, wherein the PN codes of the plural preambles are the same, but are shifted in phase from one another.

10. A spread spectrum communication system including:
a transmitter for performing spread-spectrum modulation using a pseudo noise (PN) code on a frame-structured transmission signal having data to be transmitted subsequently to at least one preamble; and
a receiver for receiving the transmission signal which is subjected to the spread-spectrum modulation, wherein said receiver includes:
  a peak counter that detects the correlation peaks between the PN code in the at least one preamble of the transmission signal and a reference pseudo noise code generated at said receiver and counts a prescribed number of correlation peaks, and
  a displacement counter that determines for each detected correlation peak, a displacement expressed by using count numbers from a reference position.

11. The spread spectrum communication system as claimed in claim 10, wherein said transmitter and said receiver are fabricated into one unit.

12. A spread spectrum communication system including a spread spectrum receiver, wherein the receiver counts a prescribed number of correlation peaks in at least one preamble of a transmission signal, and based on the counted number of correlation peaks, determines whether the transmission signal is addressed to the receiver.

13. A spread spectrum communication system, including:
a transmitter for performing spread-spectrum modulation using a pseudo noise (PN) code on a frame-structured transmission signal comprising at least one preamble having information on a transmission destination and a data portion subsequent to the at least one preamble; and
the receiver for receiving the transmission signal which is subjected to the spread-spectrum modulation from the transmitter, wherein said receiver includes a destination identifier that detects a periodicity of the correlation peaks between the PN code in the at least one preamble of the transmission signal and a reference PN code generated by the receiver to count a prescribed number of correlation peaks.

14. The spread spectrum communication system as claimed in claim 13, wherein
the receiver further checks on the basis of the counted number of correlation peaks whether the transmission signal is addressed to the receiver, and
the at least one preamble contains m periods of a pseudo noise (PN) code, and a determination of whether the transmission signal is addressed to the receiver includes counting the number of maximum correlation peaks which are continuously obtained over n periods of the PN code, each maximum correlation peak being obtained over every period of the PN code, the determination of whether the transmission signal is addressed to the receiver being determined when the counted number is equal to a predetermined number or more, where m and n represent positive integers satisfying (n≦m).

15. The spread spectrum communication system as claimed in claim 14, wherein the determination of whether the transmission signal is addressed to the receiver further includes a measure of MPP (maximum correlation peak position) dispersion to determine whether a dispersion range of positions at which the continuous maximum correlation peaks are obtained over the n periods is within a predetermined dispersion range.

16. The spread spectrum communication system as claimed in claim 15, wherein the dispersion range of the positions of the continuous maximum correlation peaks (MPPs) is determined on the basis of the maximum and minimum positional displacements (represented by MAX and MIN) from a reference position in the continuous MPPs.

17. The spread spectrum communication system as claimed in claim 16, wherein the destination identifier that identifies the transmission signal as being addressed to the receiver when the counted number of the peak counter is equal to a predetermined number or more and also the difference (MAX−MIN) is within a predetermined dispersion range.

18. The spread spectrum communication system as claimed in claim 17, wherein the transmission signal contains plural preambles which are serially arranged in the transmission signal, and when representing a value (MAX−MIN)/2 in each preamble as a representative value, the receiver further includes a phase difference measure to determine whether a difference between the representative values of respective adjacent preambles is within a predetermined phase-difference range for all the preambles.

19. The spread spectrum communication system as claimed in claim 18, wherein the destination identifier identifies the transmission signal as being addressed to the receiver when the counted number of the peak counter is equal to the predetermined number or more, the difference (MAX—MIN) is within the predetermined MPP dispersion range, and the difference between the representative values of respective adjacent preambles is within the predetermined phase-difference dispersion range for all preambles.

20. The spread spectrum communication system as claimed in claim 12, wherein the transmission signal contains plural preambles each of which contains a PN code.

21. The spread spectrum communication system as claimed in claim 20, wherein the PN codes of the plural preambles are the same, but are shifted in phrase from one another.

22. The spread spectrum communication system as claimed in claim 10, including a transmitter for performing spread-spectrum modulation using a pseudo noise (PN) code on a frame-structured transmission signal comprising at least one preamble and a data portion subsequent to the at least one preamble, and wherein the receiver further detects a periodicity of the correlation peaks between the PN code in the at least one preamble of the transmission signal and a reference PN code generated by the receiver.

23. The spread spectrum communication system as claimed in claim 22, wherein the at least one preamble contains m periods of the PN code, and the receiver includes a peak counter that counts a number of maximum correlation peaks which are continuously obtained over n periods of the PN code, each maximum correlation peak being obtained every period of the PN code, where m and n represent positive integers satisfying ($n \leq m$).

24. The spread spectrum communication system as claimed in claim 23, wherein the determination of whether the transmission signal is addressed to the receiver further includes a measure of MPP (maximum correlation peak position) dispersion to determine whether a dispersion range of positions at which the continuous maximum correlation peaks are obtained over the n periods is within a predetermined dispersion range.

25. The spread spectrum communication system as claimed in claim 24, wherein the dispersion range of the positions of the continuous maximum correlation peaks (MPPs) is determined on the basis of the maximum and minimum positional displacements (represented by MAX and MIN) from a reference position in the continuous MPPs.

26. The spread spectrum communication system as claimed in claim 25, wherein the receiver determines whether a counted number of the peak counter is equal to a predetermined number or more and also whether a difference (MAX–MIN) is within a predetermined MPP dispersion range.

27. The spread spectrum communication system as claimed in claim 26, wherein the transmission signal contains plural preambles which are serially arranged in the transmission signal, and when representing the value (MAX–MIN)/2 in each preamble as a representative value, the receiver further includes a phase difference measure to determine whether a difference between the representative values of respective adjacent preambles is within a predetermined phase-difference range for all the preambles.

28. The spread spectrum communication system as claimed in claim 27, wherein the receiver determines when the counted number of the peak counter is equal to the predetermined number or more, the difference (MAX–MIN) is within the predetermined MPP dispersion range, and the difference between the representative values of respective adjacent preambles is within a predetermined phase-difference dispersion range for all preambles.

29. The spread spectrum communication system as claimed in claim 10, wherein the transmission signal contains plural preambles each of which contains a PN code.

30. The spread spectrum communication system as claimed in claim 29, wherein the PN codes of the plural preambles are the same and shifted in phase from one another.

\* \* \* \* \*